(12) United States Patent
Potze et al.

(10) Patent No.: US 10,946,694 B2
(45) Date of Patent: Mar. 16, 2021

(54) DUAL TYRE RIM

(71) Applicant: E-TRACTION EUROPE B.V., Apeldoorn (NL)

(72) Inventors: Pieter Roelf Willem Potze, Apeldoorn (NL); Adrianus Petrus Maria Jonker, Apeldoorn (NL)

(73) Assignee: E-TRACTION EUROPE B.V., Apeldoorn (NL)

( * ) Notice: Subject to any disclaimer, the term of this patent is extended or adjusted under 35 U.S.C. 154(b) by 0 days.

(21) Appl. No.: 16/632,555

(22) PCT Filed: Jul. 20, 2018

(86) PCT No.: PCT/NL2018/050505
§ 371 (c)(1),
(2) Date: Jan. 21, 2020

(87) PCT Pub. No.: WO2019/017789
PCT Pub. Date: Jan. 24, 2019

(65) Prior Publication Data
US 2020/0156405 A1    May 21, 2020

(30) Foreign Application Priority Data
Jul. 20, 2017   (NL) ..................................... 2019305

(51) Int. Cl.
*B60B 11/06*    (2006.01)
*B60K 7/00*    (2006.01)

(52) U.S. Cl.
CPC ............ *B60B 11/06* (2013.01); *B60K 7/0007* (2013.01); *B60L 2220/44* (2013.01); *B60L 2220/50* (2013.01)

(58) Field of Classification Search
CPC ............................. B60B 11/06; B60K 7/0007
See application file for complete search history.

(56) References Cited

U.S. PATENT DOCUMENTS

| | | | | |
|---|---|---|---|---|
| 1,982,057 A | * | 11/1934 | Jobski | B60B 11/06 301/10.1 |
| 2,084,077 A | * | 6/1937 | Brunner | B60B 11/06 301/13.1 |

(Continued)

FOREIGN PATENT DOCUMENTS

| | | |
|---|---|---|
| CN | 105090450 B | 6/2017 |
| EP | 1252034 A1 | 10/2002 |

(Continued)

OTHER PUBLICATIONS

International Search Report and Written Opinion, dated Dec. 14, 2018, from corresponding PCT application No. PCT/NL2018/050505.

*Primary Examiner* — Erez Gurari
(74) *Attorney, Agent, or Firm* — Nixon & Vanderhye

(57) ABSTRACT

Disclosed is a drive assembly for an in-wheel motor, which in-wheel motor has a rotor, the rotor having an axis of rotation, a peripheral outer surface and a transverse road side surface, wherein the drive assembly is provided with a assembly adapted for supporting two tyres and includes a circumferential first part and a circumferential second part, each part provided with a rim-section for carrying a respective one of the two tyres, wherein the first part and second part are adapted to be mounted on the rotor from and at the transverse road side surface of the rotor and are detachable from the rotor from the transverse road side surface, and wherein the second part is detachable from the rotor independent from the first part.

20 Claims, 6 Drawing Sheets

(56) References Cited

U.S. PATENT DOCUMENTS

Figure 1A:
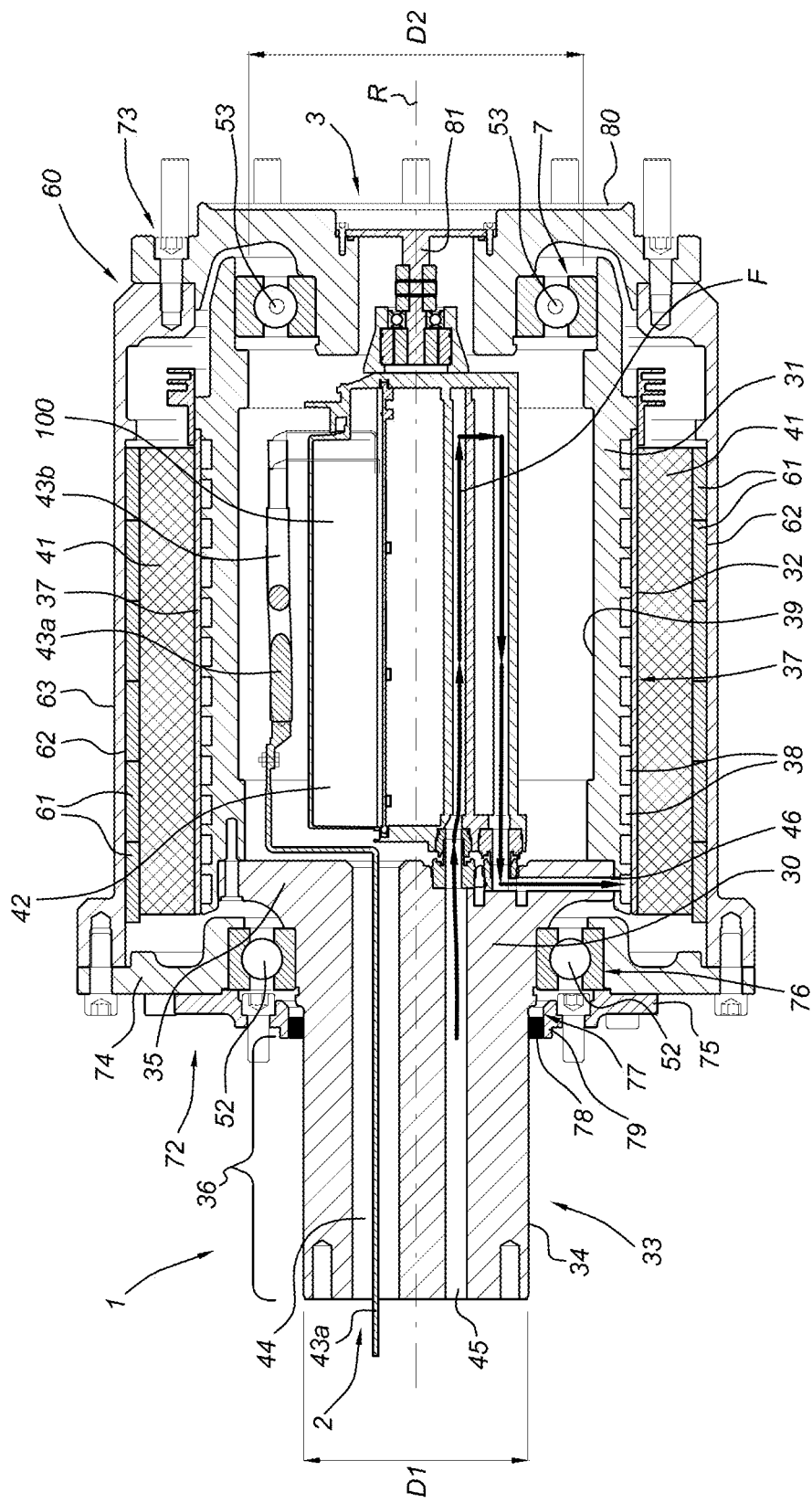

| | | | | |
|---|---|---|---|---|
| 2,635,012 A * | 4/1953 | Rappaport | ............. | B60B 11/06 301/36.1 |
| 3,237,992 A * | 3/1966 | Kiesau | ............... | B62D 49/0621 301/36.1 |
| 3,837,709 A * | 9/1974 | Williamson | ............ | B60B 11/06 301/13.2 |
| 3,847,442 A * | 11/1974 | Masser | ................... | B60B 11/06 301/13.2 |
| 4,330,045 A * | 5/1982 | Myers | ................... | B60L 3/0076 180/65.51 |
| 4,437,530 A * | 3/1984 | De Young | ............... | B60B 11/06 180/372 |
| 4,799,564 A * | 1/1989 | Iijima | .................. | B60K 7/0007 180/65.51 |
| 5,083,597 A * | 1/1992 | France | ................... | B60B 25/14 152/410 |
| 6,006,870 A * | 12/1999 | Gazyakan | ............... | B60B 11/06 180/65.6 |
| 6,139,464 A * | 10/2000 | Roske | ................... | B60K 7/0007 180/65.6 |
| 6,148,940 A * | 11/2000 | Hokanson | ............... | B60B 11/00 180/65.51 |
| 6,148,941 A * | 11/2000 | Hinton | ................ | B60K 17/046 180/65.51 |
| 6,328,123 B1 * | 12/2001 | Niemann | ................ | F16D 55/40 180/65.51 |
| 7,347,427 B2 * | 3/2008 | Heinen | .................... | B62M 6/65 280/5.514 |
| 8,720,623 B1 * | 5/2014 | Kim | ....................... | B60K 11/02 180/65.51 |
| 8,763,495 B2 * | 7/2014 | Witcher | ................ | B60B 35/125 74/607 |
| 9,387,758 B2 * | 7/2016 | Heinen | ............... | B60L 15/2009 |
| 9,421,823 B2 * | 8/2016 | Barbir | .................... | B60B 35/18 |
| 10,604,002 B2 * | 3/2020 | Van Der Wal | ......... | H02K 21/22 |
| 2005/0236198 A1 * | 10/2005 | Jenkins | .................. | H02K 7/116 180/65.51 |
| 2010/0140020 A1 * | 6/2010 | Murahashi | ............. | B60B 25/04 184/6.12 |
| 2010/0191417 A1 * | 7/2010 | Murahashi | ............. | B60B 11/06 701/36 |
| 2010/0194180 A1 * | 8/2010 | Gibson | ................ | B60K 7/0007 301/36.1 |
| 2012/0142475 A1 * | 6/2012 | Shibukawa | .......... | B60K 17/046 475/159 |
| 2012/0217788 A1 * | 8/2012 | Vallejo | ................. | B60K 17/046 301/6.5 |
| 2012/0231915 A1 * | 9/2012 | Vallejo | .................. | B60B 35/125 475/149 |
| 2012/0292979 A1 * | 11/2012 | Noblanc | .................. | B60B 11/02 301/36.1 |
| 2013/0002007 A1 * | 1/2013 | Vallejo | .................... | B60B 11/06 301/105.1 |
| 2015/0084397 A1 * | 3/2015 | Kudo | .................. | B60B 27/0015 301/6.5 |
| 2015/0107406 A1 * | 4/2015 | Tarbell | .................... | F16D 1/101 74/640 |
| 2017/0368931 A1 * | 12/2017 | Tesar | ..................... | B60K 17/02 |
| 2019/0383340 A1 * | 12/2019 | Seaman | ................... | H02K 9/02 |
| 2020/0156405 A1 * | 5/2020 | Potze | .................. | B60K 7/0007 |

FOREIGN PATENT DOCUMENTS

| | | |
|---|---|---|
| FR | 2760502 A1 | 9/1998 |
| WO | 0154939 A3 | 2/2002 |
| WO | 2013025096 A1 | 2/2013 |

\* cited by examiner

DUAL TYRE RIM

FIELD OF THE INVENTION

The present invention relates to a rim assembly for an in-wheel motor, which in-wheel motor has a rotor with a peripheral outer surface and a transverse road side surface, wherein the rim assembly is adapted for supporting two tyres and is further adapted to be supported by the peripheral outer surface of said rotor.

A drive assembly for a wheel of a vehicle, such as an electrically powered car or truck, may comprise an in-wheel electric motor with a rotor and a stator both adapted to be arranged at least partially within the wheel, the rotor being provided with a plurality of magnets at or near its inner circumference, and the stator being arranged within the rotor and comprising electromagnets at or near its outer circumference. As the flux-carrying area of the electromagnets increases with the surface of the stator which is covered by the electromagnets magnets, it is preferred to design the electric motor such that the area of the stator that is covered by the electromagnets is maximized. This may at least partially be achieved by arranging the electromagnets close to the permanent magnets of the rotor, preferably with only a small gap between the electromagnets of the stator and the facing magnets of the rotor.

When such a drive assembly is to be installed in a vehicle, e.g. a car or a truck, it is particularly advantageous if the electric motor is a direct drive electric motor, i.e. a motor in which the electromagnets directly drive rotation of the rotor around the stator. This allows the drive assembly and/or the vehicle to which it is mounted to be constructed without intermediate gears, heavy transmission axles, or the like, in this manner saving both weight and space while minimizing the number of moving mechanical parts in the drive assembly.

Preferably, control electronics are provided within the stator, said control electronics being adapted for converting electrical energy from a power supply system of the vehicle, e.g. a battery pack and/or an electric generator, to a form suitable for use by the electric motor. The control electronics typically comprise power electronics, e.g. IGBT current modules and a current regulator, such as described in EP 1252034. By using the control electronics to control the current and/or voltage supplied to the electric motor, the electric motor can be operated at a desired torque and/or speed of rotation. Moreover, the length of bus bars and/or power lines which run from the control electronics to the electromagnets may remain short, which is highly desirable in view of the electrical current and voltage generally required for operating such an electric motor, which respectively are typically at least 25 A and at least 200 V.

In order to cool the electric motor and/or the control electronics, the drive assembly is preferably provided with a cooling system adapted for transporting heat energy away from the drive assembly. Such a cooling system may comprise one or more cooling channels close to an outer surface of the stator and/or the control electronics, through which liquid coolant can flow into and out of the drive assembly.

The drive assembly is preferably embodied as a substantially self-contained module, without any moving parts of the vehicle attached to and/or extending into the rotor. The interior space defined by the rotor is preferably substantially closed off to prevent ingress of foreign particles, such as dust and/or wear particles released by a brake system of the vehicle and/or by the road, into said interior.

The drive assembly may be attached at only one side to the vehicle, e.g. its vehicle side, while the opposite side is spaced apart from the vehicle. Herein, the vehicle side of the drive assembly or a component thereof is defined as that side of the drive assembly or component thereof which, when the drive assembly is mounted to a vehicle, faces towards the vehicle. A road side of the drive assembly or a component thereof is herein defined as the side thereof which is arranged opposite to its vehicle side along the rotor's axis of rotation.

A rim may be attached to the rotor for mounting a tire thereon. Preferably, the outer surface of the rotor and the inner surface of the rim are adapted for allowing the rim to be slid over the outer surface of the rotor such that the rim is supported thereby. For this purpose, at least the portion of the outer surface of the rotor on which the rim is to be supported is substantially cylindrical.

BACKGROUND ART

From WO 2013/025096 a drive assembly for a vehicle is known which assembly is provided with a wheel comprising: a housing which extends at least partially within the wheel and has a first side for mounting to a vehicle; an electrical motor for driving movement of said vehicle, the electrical motor comprising a stator that is rotation-fixedly connected to said housing and a rotor which is rotationally coupled to the stator and has an axis of rotation, wherein the stator is surrounded by the rotor.

U.S. Pat. No. 6,006,870 describes a disc brake arrangement for an individual wheel drive with a rear-mounted planetary gear for motor vehicles. The input power provided by two prime movers, such as two electro motors which lie outside a wheel hub of the wheel drive, is combined to drive a spur gear assembly which is connected by a shaft with the sun gear of a planetary gear. The planet carrier drives two integrally connected rim sections which are supported on an outer circumferential surface of the wheel hub, each of the rim sections carrying a tyre.

U.S. Pat. No. 5,083,597 describes a dual rim assembly structure wherein a split cylindrical spacer with wedge shaped edges or annular split wedge support rings are provided in order to provide lateral stability and support for inner and outer rim assemblies of the structure. When a lateral force is applied, the wedges of the spacer are forced into engagement with the respective inclined surfaces of the gutter bands, thereby supporting both the inner and outer rim assemblies. A drawback of this dual rim assembly structure is that removing a single tyre from the structure is a complex and time consuming task.

It is an object of the present invention to provide a dual tyre rim assembly which allows a single tyre to be more easily attached and detached from the dual tyre rim assembly.

It is a further object of the present invention to provide a dual tyre rim assembly for an in-wheel motor, which in-wheel motor has a rotor, which rim assembly dampens propagation of radial impact forces onto the rotor.

SUMMARY OF THE INVENTION

To the end, according to a first aspect, the present invention provides drive assembly for a vehicle, the drive assembly comprising an in-wheel electric motor with a stator and with a rotor which has a peripheral outer surface and a transverse road side surface, the rotor being provided with a plurality of electromagnets at or near its inner circumference, wherein the rotor has an axis of rotation, a peripheral outer surface and a transverse road side surface, wherein the stator is arranged within the rotor and comprises electromagnets at or near its outer circumference, wherein the stator and rotor are both arranged at least partially within the wheel; the drive assembly further comprising a rim assembly adapted for supporting two tyres and comprises a circumferential first part and a circumferential second part, each part provided with a rim-section for carrying a respective one of said two tyres, wherein the first part and second part are both adapted to be mounted on the rotor from and at the transverse road side surface of the rotor and are detachable from the rotor from said transverse road side surface, wherein the second part is detachable from the rotor independent from the first part.

The first and second part may be mounted on the rotor from the transverse road side surface by first arranging the first part around the peripheral outer surface from the transverse road side surface and subsequently arranging the second part around the peripheral outer surface from said transverse road side surface, after which the position of the first and second part with respect to the transverse road side surface of the rotor is fixed, e.g. by bolting the first and second part in place at said transverse road side surface.

To facilitate mounting of the first part and second part around the peripheral outer surface of the rotor, the first and second part are preferably adapted to avoid clamping against the peripheral surface of the rotor. This may be ensured, for instance e.g. by providing the first and second parts such that their corresponding inner circumferential surfaces have a larger diameter than the diameter of the peripheral outer surface of the rotor. When mounted, the first part and second part are preferably radially spaced apart from each other and from the peripheral surface of the rotor, so that the first and second part are substantially only supported at the transverse road side surface of the rotor. This manner of mounting the first and second part, i.e. without the first or second part being radially supported on the rotor, reduces propagation of radially directed impact from the tyres to the rotor and any magnets that may be present within the rotor.

Once the first and second part have been mounted on the rim, the second part may be removed from the rim independent from the first part, i.e. while the axial position of the first part relative to the rotor remains substantially constant, by loosening the second part from the transverse road side surface, e.g. by removing any bolts or the like which fix the second part to the rim and/or to the first part, and subsequently moving the second part axially away from the first part and the transverse road side surface of the rotor. This allows easy replacement of the second part, in particular allows detachment and removal of the second part from the rotor as a single unit with a tyre which is held by the rim-section of the second part, without deflating the tyre. Likewise, the first part may be mounted on the rotor while an inflated tyre is held by the rim section of the first part. Thus, besides mounting the first and/or second part on the rotor and fixing the position of these on the rotor, substantially no further action is required before the dual tyre rim is ready for use.

In an embodiment, the first and second part are configured such that, when mounted on the rotor, the length of the first part along the axis of rotation is greater than a sum of the length of the first rim section along the axis of rotation and the length of the second part along the axis of rotation. This allows the rim sections of both the first and second part to be arranged substantially on a same side of the transverse road side surface, i.e. substantially on a same side of a plane that extends through the transverse road side surface.

In an embodiment the first and second part are configured such that, when mounted, the second part overlaps the first part over at least 80%, preferably 100% of the length of the second part along the axis of rotation.

In an embodiment the rim-sections of the first and second part each define a longitudinal axis, wherein said first and second part each comprise a substantially planar attachment section for mounting said part on the rotor at the transverse road side surface. When mounted, the attachment section of the first part may abut the transverse road side surface of the rotor on one side, and may abut the attachment second of the second part on an opposite side, e.g. such that when the two parts are fixed at the transverse road side surface, the attachment section of the first part is at least partially clamped between the transverse road side surface of the rotor and the attachment section of the second part. This may for instance be the case when the planar attachment section of the first and/or second part extend parallel to each other when mounted on the transverse road side surface of the rotor, preferably when the attachment sections of the first and second part extend substantially normal to the longitudinal axis of said part.

In an embodiment the first and second part each further comprise a bridge section which connects the rim section to the attachment section and extends at least partially along the longitudinal axis. At least a substantial part of each bridge section thus extends substantially in a different direction than the attachment section, the bridge section bridging the angle between the attachment section and the rim-section of each part and forming a connection therebetween. To this end, the bridge section preferably comprises a curved or angled portion at the point where it connects to the planar attachment section.

When the first and second part are mounted on the rotor, the bridge sections of the first and second part preferably extend completely on a same side of a plane parallel to and through the attachment section of the second part. The bridge sections thus both extend from their point of attachment to the corresponding attachment section towards the vehicle side.

The rim sections and bridge sections of each part may be fixedly attached to each other, e.g. by welding. Preferably, when the first part and second part are mounted on the rotor, their bridge sections are spaced apart from each other. Any radial forces exerted on the rim-sections by the tyres are thus substantially only propagated to the rotor via the attachment sections. When the rim section of the second part is spaced apart from both the bridge section and the rim section of the first part, propagation of any radial forces from the second part to the first part, other than via the respective attachment sections, is also substantially prevented.

In an embodiment the first and second part are configured such that, when the first and second part are mounted on the rotor, the rim section of the second part is radially spaced apart from the bridge section of the first part.

In an embodiment the bridge sections are arranged such that, when the first and second part are mounted on the rotor, the second bridge section partially surrounds the second first section.

In an embodiment the bridge section of the second part is adapted to be mounted concentrically around the bridge section of the first part, preferably radially spaced apart therefrom.

In an embodiment the first and second part are configured such that, when the first and second part are mounted on the rotor, the bridge section of the first part extends from the first attachment section in a direction towards the first rim section, and the bridge section of the second part extends from the second attachment section to the second rim section in a direction towards the first rim section.

In an embodiment the bridge section of the second part has a length along the longitudinal axis of the second part which is greater than a length of the first rim section along the longitudinal axis of the first part.

In an embodiment, the attachment section and bridge section are formed as a unitary part, with the attachment section extending substantially normal to a longitudinal axis of the corresponding first or second part and merging into the bridge section which extends substantially non-normal to the longitudinal axis. To provide structural strength, the bridge section is preferably a substantially circumferential bridge section.

In an embodiment a distance between the attachment section of the first part and the portion where the bridge section of the first part connects to the rim section of the first part is greater than a distance between the attachment section of the second part and a portion where the bridge section of the second part connects to the rim section of the second part. Herein, the distance is measured as the smallest distance along longitudinal axis of the respective part. When mounted on the rim, the second part may thus surround a portion of the first part, in particular the rim-section of the second part may surround a portion of the bridge section of the first part. Preferably, except at their attachment sections, the second part is spaced apart from the first part.

In an embodiment, for each of the first and second part, the attachment section, when projected onto a plane normal to the longitudinal axis of said part, is arranged within and spaced apart from its corresponding rim section. Thus the attachment section of each part has an outer diameter which is smaller than the smallest inner diameter of the corresponding rim-section.

In an embodiment, when the first part and the second part are mounted on the rotor, the bridge section of the second part is substantially arranged between the peripheral outer surface and the first part.

In an embodiment, the rim-section of the second part and/or the rim section of the first part, when mounted, is radially spaced apart by a predetermined distance from the peripheral outer surface and is substantially completely supported on the rotor via its bridge section, by its attachment section.

In an embodiment, when mounted, said rim-section of the second part is radially spaced apart from the bridge section of the first part.

In an embodiment the first and second part are configured such that, when mounted on the rotor, the length of the first part along the axis of rotation is greater than a sum of the length of the first rim section along the axis of rotation and the length of the second part along the axis of rotation. When mounted, the first part thus extends a significantly greater length along the peripheral outer surface of the rotor, preferably with the second part surrounding the first part over at least half or three fourths of the length of the second part.

In an embodiment said rim-section of said first and/or second part is provided with an air supply duct, for supplying air to a tyre mounted on said rim section.

In an embodiment the air supply duct of the first and/or second part runs from the rim-section of said part to the road side surface of the rotor. A source of pressurized air can thus be connected to the air supply duct from the transverse road side surface, for inflating a tyre held by the first or second rim-section. The air supply duct of the first and/or second part preferably runs through the attachment section of said part.

In an embodiment the rim assembly comprises a valve connected to said air supply duct for blocking air from flowing out of a space defined by the corresponding rim section and a tyre mounted thereon.

In an embodiment, when mounted on the rotor, the first part and the second part are attached to each other at or near the transverse road side surface.

In an embodiment said peripheral outer surface is a circumferential outer surface and the first and second part are adapted be substantially completely spaced apart from the peripheral outer surface when mounted on the rotor. The rim assembly is thus adapted to be substantially completely supported at the transverse road side surface of the rotor, rather than by the peripheral surface. Deformation of the outer surface of the rotor, where typically the magnets are arranged, can thus be substantially prevented. Additionally, the rim assembly may act as a spring which dampens propagation of impact on the tyre to any magnets in the rotor.

According to a second aspect, the present invention provides rim assembly for use in a drive assembly as described herein, wherein the rim assembly is adapted for supporting two tyres and comprises: a circumferential first part and a circumferential second part, each part provided with a rim-section for carrying a respective one of said two tyres, wherein said first part and second part are both adapted to be mounted on the rotor from and at the transverse road side surface of the rotor and are detachable from the rotor from said transverse road side surface, wherein the second part is detachable from the rotor independent from said first part, wherein, when mounted on the rotor, the first part and the second part are attached to each other at or near the transverse road side surface of the rotor. It will be appreciated that embodiments of the drive assembly which relate to features of the rim assembly can be combined with the rim assembly according to the invention.

According to a third aspect, the present invention provides a first part and/or a second part of a rim assembly as described herein.

SHORT DESCRIPTION OF DRAWINGS

Figure 2A:
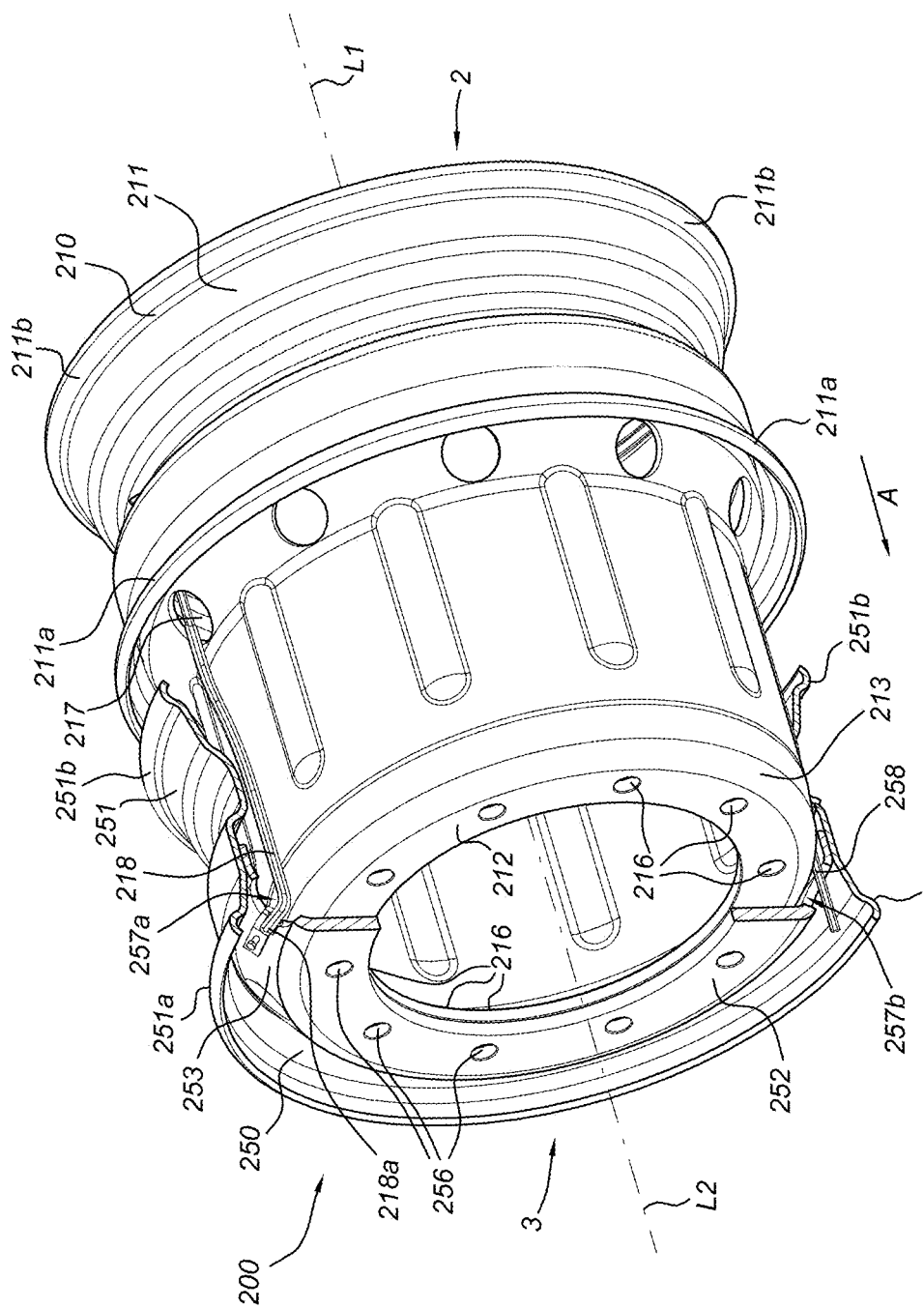
Figure 2B:
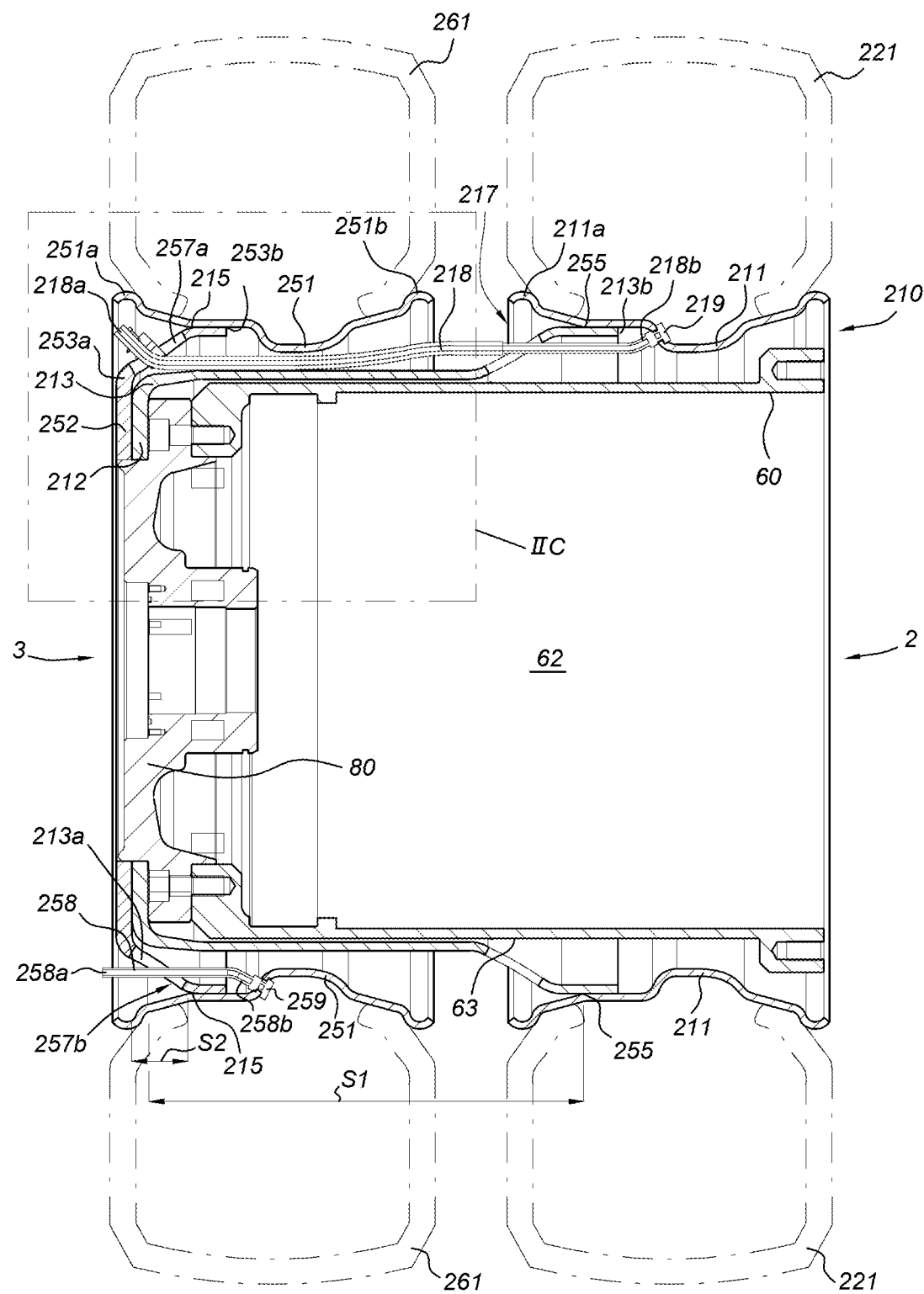
Figure 2C:
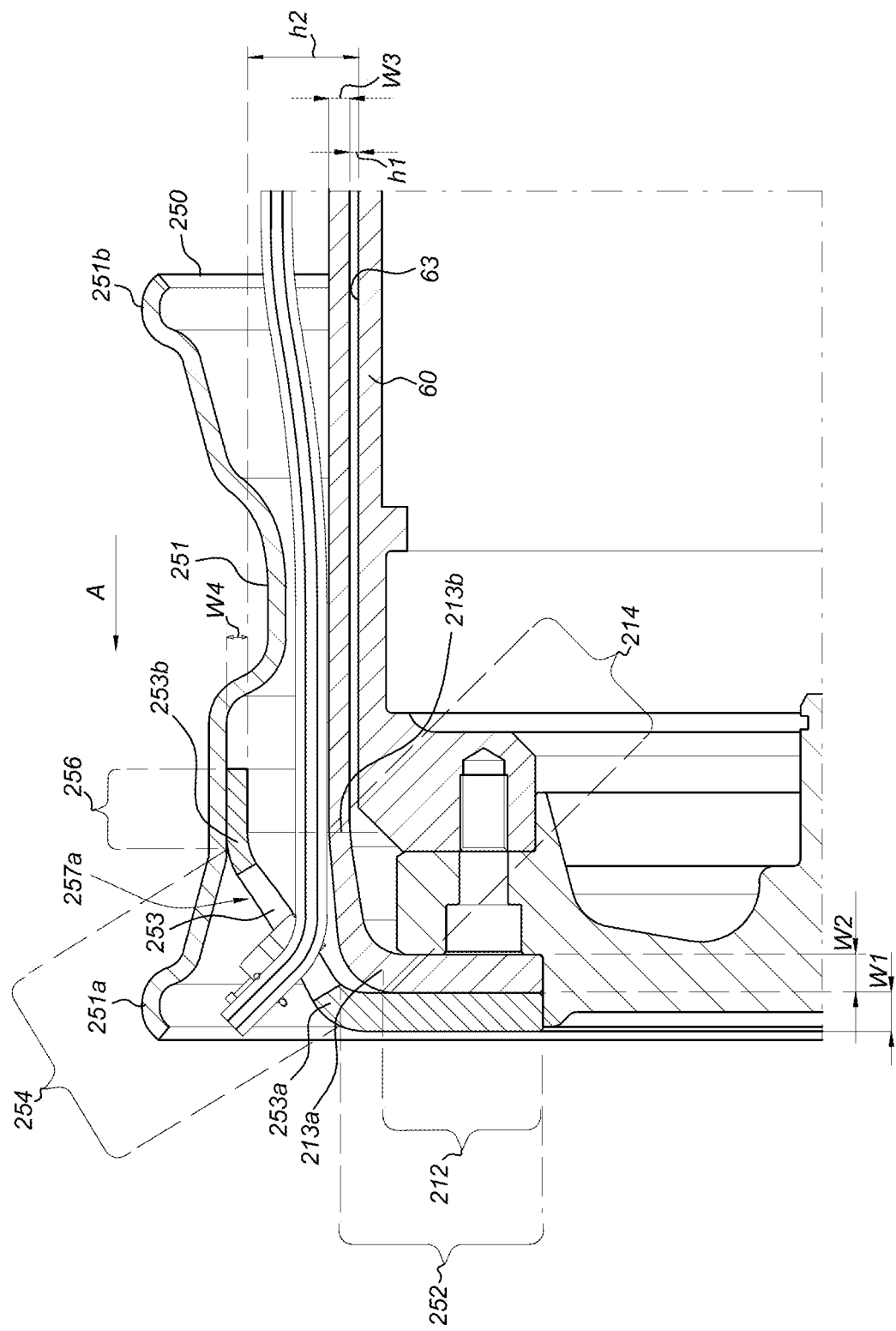

The present invention will be discussed in more detail below, with reference to the attached drawings, in which FIGS. 1A and 1B respectively show a cross-sectional view and a cut-away isometric view of a drive assembly for use with the present invention;

FIGS. 2A and 2B respectively show an isometric view and a cross-sectional view of a rim assembly according to the present invention;

FIG. 2C shows a detail of section C of FIG. 2B; and

Figure 2D:
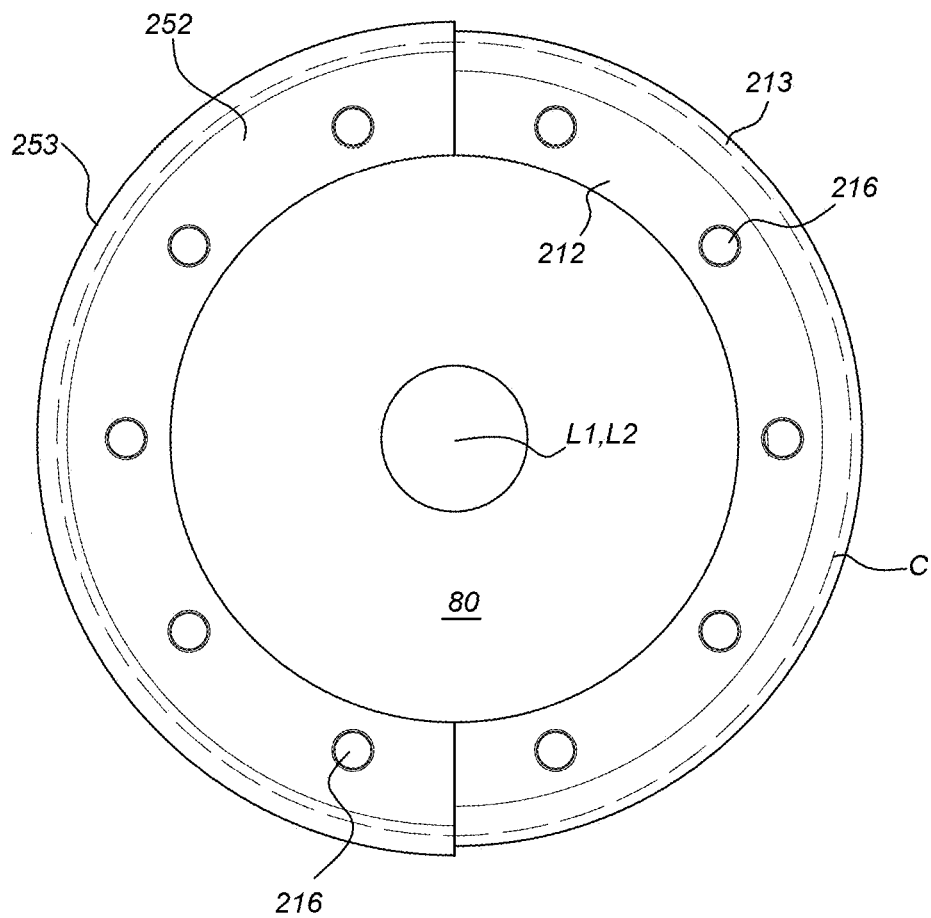

FIG. 2D schematically shows a view of a first part and a second part of the rim assembly according to the present invention, from the vehicle side thereof.

DESCRIPTION OF EMBODIMENTS

Figure 1B:
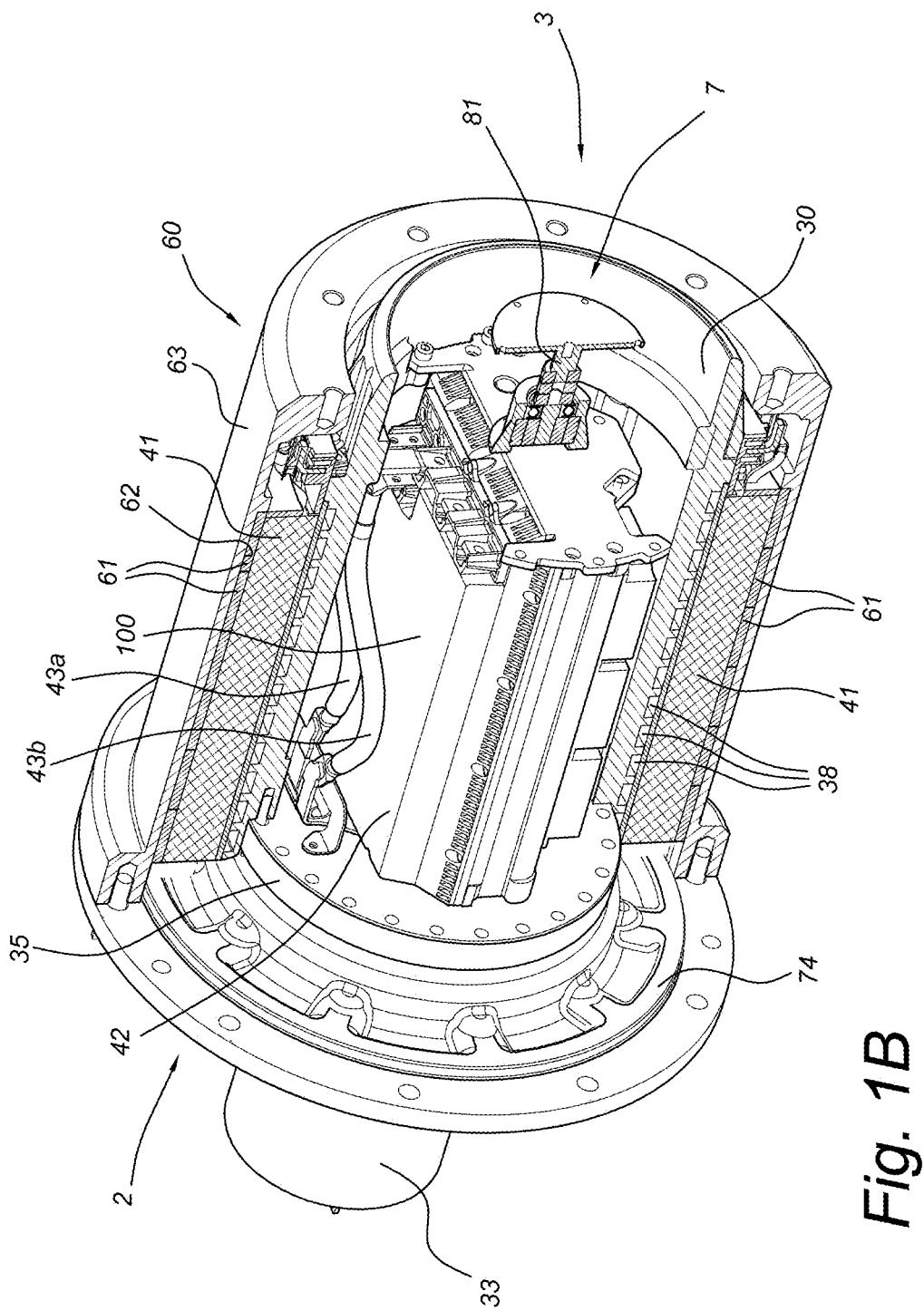

FIGS. 1A and 1B respectively show a cross-sectional view and a cut-away isometric view of a drive assembly 1 for use with the present invention. The drive assembly comprises a stator 30 with a hollow stator body 31 which has an outer surface 32 around which a rotor 60 is arranged. The assembly further comprises an connector member 33, arranged at a vehicle side 2 of the assembly 1 and comprising a shaft 34 for attaching the drive assembly to the vehicle.

Facing away from the vehicle side 2 is a road side 3 of the drive assembly. The shaft 34 is rotation-fixedly connected in the axial direction to the stator body 31 via flange 35 which lies within the rotor 60 and has a larger diameter than a diameter D1 of a portion 36 of the shaft 34 which lies outside the peripheral outer surface 63 of the rotor 60. For supporting rotational movement of the rotor 60 relative to the stator 30 around the axis of rotation R, vehicle side bearings 52 are provided via which the rotor is rotatingly supported by the shaft 34 on the vehicle side 2 of the rotor. On its road side 3 the rotor is rotatingly supported by the stator body 31 via road side bearings 53.

A plurality of permanent magnets 61 is attached on inner circumferential surface 62 of the rotor 60 and can rotate around electromagnets 41 of the stator 30. The electromagnets 41 are rotationally fixed with respect to the stator body 31. Together the stator 30 and rotor 60 form an electric motor adapted for directly driving rotation of the rotor relative to the stator around the axis of rotation R. For controlling and powering the electromagnets 41, control electronics 42 are arranged within the hollow stator body 31. The control electronics 42 comprise components, such as IGBT's, for converting electrical energy from a power supply system of the vehicle, e.g. a battery pack and/or an electric generator, to a form suitable for use by the electric motor. To prevent overheating of the power control electronics and/or the electromagnets 41 when the electric motor is in operation, the stator 30 is provided with a cooling jacket 37 on the outer surface 32 of the stator body 31. The cooling jacket comprises a channel or channels 38 which form a circuit which runs along the hollow cylindrical body 31 and provides a passage through which liquid coolant can flow to cool the power control electronics 42 which are arranged on an inner side 39 of the cooling jacket 37, and/or electromagnets 41 which are arranged at an outer side of the cooling jacket 37.

Electrically conductive power supply lines 43a, 43b for supplying power to the control electronics 42 run through shaft 34, to the control electronics in the interior of the hollow stator body. Likewise, a coolant supply channel 45 runs from the vehicle side 2, through the shaft 34 to the interior of the rotor 30 for supplying liquid coolant to be circulated along the control electronics 42. The direction of flow of the liquid coolant is schematically indicated by arrows F. Once the liquid coolant has passed along the control electronics, it passes through passage 46 in the flange 35 to the cooling jacket 37 for cooling the electromagnets 41. Relatively cold coolant can thus be supplied through the coolant supply channel, with the coolant warming up during its passage through the channel or channels 38 and absorbing heat-energy from the electromagnets 41 and/or control electronics 42 before being removed from the drive assembly 1 and led back to the vehicle through a coolant discharge channel. Though the coolant discharge channel is not shown in FIG. 1A, it will be clear that it extends from the cooling jacket, through the flange 35 and the axle 34, so that the warmed up coolant can be discharged at the vehicle side 2. The warmed up coolant is preferably cooled in the vehicle, after which it may be recirculated through the coolant supply channel.

The rotor 60 comprises a substantially cylindrical rotor body 71 which has transverse ends 72,73 respectively at its vehicle side 2 and at its road side 3. Both transverse ends 72,73 are substantially closed off in order to prevent foreign particles, such as dust and wear particles from the road or released by a braking system of the vehicle, from entering the interior of the rotor 60 as well as the interior of the stator 30. The transverse end 72 at the vehicle side 2 is substantially closed off by a first side plate 74 which extends substantially normal to the axis of rotation R and is provided with an opening 76 through which the shaft 34 extends. The first side plate 74 supports the vehicle side bearings 52. In order to protect these bearings 52, a cover plate 75 is attached to the first side plate 74, which cover plate covers the bearings 52 at their transverse vehicle side 2 and comprises an opening 77 through which the shaft 34 extends as well. The cover plate 75, together with a shaft seal 78 which is arranged between the inner circumferential edge 79 of the opening 77 and the outer circumference of the shaft 34, prevents foreign particles from damaging the vehicle side bearings 52. Additionally, the cover plate 75 and shaft seal 78 substantially prevent such particles from entering the interior of the rotor from the vehicle side 2, where the particles could interfere with the electromagnets 41.

The road side bearings 53, which are arranged at an inner side of the stator body 31, are covered on their road side 3 by a second side plate 80. A rotary encoder 81 rotationally connected the stator 30 to the second side plate 80 and is adapted for detecting an rotational position of the rotor 60 relative to the stator 30. For reasons of clarity, neither the second side plate 80, nor the road side bearings 53 are shown in FIG. 1B.

FIG. 2A shows a view of a rim assembly 200 according to the present invention, e.g. for use with a drive assembly of FIGS. 1A and 1B. FIG. 2B shows a cross-sectional view of the same rim assembly 200, mounted on a rotor of a drive assembly which has a vehicle side surface 2 and a road side surface 3.

The rim assembly comprises a first part 210 and a second part 250, each of said parts 210, 250 comprising a rim section 211, 251. The rim-sections 211, 251 each are formed as a single piece and are adapted for holding thereon a tyre 221, 261, schematically shown in dotted lines in FIG. 2B. The relative position between outer flanges 211a, 211b against which a tyre can lie is thus fixed, and the relative position between outer flanges 251a, 251b against which a tyre can lie is fixed as well. When the first part and second part are not fixed to the rotor, they can be moved, together with any tyres mounted on the corresponding rim-sections, as a whole. In FIG. 2B the first and second part can be moved in conjunction along direction A parallel to the axis of rotation R of the rotor 60 and away from the vehicle side 2 of the rotor 60. Alternatively it is possible to only move the second part 250, and any tyre mounted on the second rim section 251, in direction A, while leaving the first part 210, and any tyre mounted on the first rim section 211 in place on the rotor 60.

FIG. 2C shows a detail of section IIC of FIG. 2B. The first part comprises a bridge section 213 which has an inner surface that is radially spaced apart by a distance h1 from the peripheral outer surface 63 of the rotor 60. An inner surface of bridge section 253 of the second part 250 is radially spaced apart by a distance h2 greater than h1 from the peripheral outer surface 63. As the first rim-section and the second rim-section are also radially spaced apart from the peripheral outer surface 63, the first rim section and second rim section are thus completely supported on the rotor, via the corresponding bridge sections 213, 253, by the attachment sections 212, 252 at the transverse road side surface of the rotor 60. The rim section 251 of the second part 250 is completely radially spaced apart from the bridge section 213 of the first part, thus preventing the rim section 251 from clamping against the first part and allowing the second part to be detached from the rotor 60 from the transverse road side surface 3 and along direction A. Referring back to FIG. 2A, the attachment sections 212, 252 extend substantially parallel to each other and normal to the longitudinal axes L1, L2 of the first and second part, and are provided with a number of through openings 216, 256 through which bolts may be inserted to fix the first part and/or the second part to the transverse road side surface 3 of the rotor 60. Though preferably, when mounted, the through openings 216 in the first part are coaxial with the through openings 256 in the second part, it is conceivable that the first part comprises at least one separate through opening which directly accessible from the transverse road side surface when the first and second part are mounted to the rotor. The first part may thus remain fixed in place with respect to the rotor by means of a bolt or the like which extends through the separate through opening and clamps the first part against the rotor, while the second part may be detached from the rotor when all bolts which clamp the second part to the rotor are removed from the through openings 256.

As shown in more detail in FIG. 2C, the bridge sections 213, 253, which extend between ends 213a, 253a and 213b, 253b thereof, are respectively provided with a curved portion 214 and an angled portion 254, which at one end 213a, 253a of the bridge section merges into the corresponding attachment section 212, 252. The curved or angled portion bridges the angle between the attachment section 212, 252 and the longitudinal axis L1, L2 of the respective rim-sections, the angle typically being about 90 degrees. The bridge sections, including their curved or angled portions, are substantially spaced apart from each other and from the rotor 60 to prevent friction between the bridge sections and/or the rotor.

The thickness of each respective attachment section is greater than the thickness of the corresponding bridge sections at the point 215, 255 where the bridge section 213, 253 connects to the rim-section 211, 251. In the embodiment shown, the attachment sections 212, 252 have a thickness w1, w2 at least twice as great as the thickness w3, w4 of the corresponding bridge sections at the point 215, 255 where each bridge section connects to the rim-section of the first or second part. To achieve this, the thickness of the bridge section decreases in a direction away from where it is connected to the attachment section, preferably substantially least until the bridge section is oriented substantially parallel to the peripheral outer surface 63, e.g. at point 215 and 255.

The bridge section 253, including its curved portion 254 and remaining portion 256, is substantially arranged between the first part 210 and the peripheral outer surface 63 of the rotor 60, and spaced apart from both.

Referring back to FIGS. 2A and 2B, the first part 210 is provided with an air duct 218 having a first end 218a proximate to the attachment section 212, and a second end 218b at which a valve 219 is provided and which debouches in the outer circumferential surface of the first rim part 211. The second part 250 comprises an air duct 258 having a first end 258a proximate to attachment section 252, and a second end 258b at which a valve 259 is provided and which debouches in the outer circumferential surface of the first rim part 211. The valves 219, 259 are adapted for preventing air from moving through the valve and the corresponding air duct in a direction away from the corresponding rim-section.

A tyre mounted on the first or second rim section can thus be inflated by supplying air through the air ducts 218,258, and the air within the tyres is prevented from escaping by the valves 219, 259. Air duct 218 passes through an opening 217 in bridge section 213 of the first part 210 and through an opening 257a in the bridge section 253 of the second part 250 so that end 218a of the air duct can be accessed from the transverse road side. Air duct 258 passes through an opening 257b in bridge section 253 of the second part, allowing its end 258a to be accessed from the transverse road side as well.

The distance s1 along the longitudinal axis between where the attachment section 212 lies against the transverse side of the rotor the portion 215 where the bridge section of the first part connects to the rim section 211 is greater than a distance s2 between where the attachment section 252 lies against the attachment section 212 a portion where the bridge section 253 connects to the rim section of the second part.

FIG. 2D schematically shows a partially cut-away partial side view from the road side 2, of a first part according to the present invention and a second part according to the present invention, with circle C in dotted lines presenting the outer peripheral surface 63 of a rotor onto which the first and second parts are to be mounted. The attachment section 252 of the second part has a larger outer diameter than the attachment section 212 of the first part, so that the corresponding bridge sections lie at different distances from the longitudinal axes L1, L2 and are spaced apart from each other. Consequently, the second part can be mounted over the first part without friction and/or clamping occurring between the respective bridge sections 213, 253.

In summary, the invention relates to a drive assembly for an in-wheel motor, which in-wheel motor has a rotor, said rotor having an axis of rotation, a peripheral outer surface and a transverse road side surface, wherein the drive assembly is provided with a rim assembly adapted for supporting two tyres and comprises a circumferential first part and a circumferential second part, each part provided with a rim-section for carrying a respective one of said two tyres, wherein the first part and second part are adapted to be mounted on the rotor from and at the transverse road side surface of the rotor and are detachable from said transverse road side surface, and wherein the second part is detachable from the rotor independent from said first part.

The present invention has been described above with reference to a number of exemplary embodiments as shown in the drawings. Modifications and alternative implementations of some parts or elements are possible, and are included in the scope of protection as defined in the appended claims. For instance, through the rim assembly may be used with an in-wheel motor which comprises a rotor, it is also suitable to be used on a rotor or hub, which does not form part of an in-wheel motor, as long as the as the rotor or hub is rotatable around an axis of rotation relative to a vehicle to which it is attached.

The invention claimed is:

1. A drive assembly (1) for a vehicle, comprising:
an in-wheel electric motor with a stator (30) and a rotor (60), the rotor being provided with a plurality of magnets at or near its inner circumference, wherein the rotor has an axis of rotation, a peripheral outer surface (63) and a transverse road side surface (3), wherein the stator is arranged within the rotor and comprises electromagnets at or near an outer circumference of the stator, wherein the stator and rotor are both arranged at least partially within the wheel;
a rim assembly (200) adapted for supporting two tyres and comprising a circumferential first part (210) and a circumferential second part (250), each part provided (210, 250) with a rim-section (211, 251) for carrying a respective one of said two tyres;
wherein said first part (210) and second part (250) are both adapted to be mounted on the rotor from and at the transverse road side surface (3) of the rotor and are detachable from the rotor from said transverse road side surface (3), wherein the second part (250) is detachable from the rotor independent from said first part (210).

2. The drive assembly according to claim 1, wherein the rim-sections (211, 251) of the first and second part (210,250) each define a longitudinal axis (L1, L2), and wherein said first and second part each comprise a substantially planar attachment section (212, 252) for mounting said part (210, 250) on the rotor at the transverse road side surface.

3. The drive assembly according to claim 2, wherein said first and second part each further comprise a bridge section (213, 253) which connects the rim section to the attachment section (212, 252) and extends at least partially along the longitudinal axis.

4. The drive assembly according to claim 3, wherein the first and second part are configured such that, when the first and second part are mounted on the rotor, the rim-section (251) of the second part is radially spaced apart from the bridge section (213) of the first part.

5. The drive assembly according to claim 3, wherein said bridge sections are arranged such that, when the first and second part are mounted on the rotor, the second bridge section (253) partially surrounds the first bridge section (213).

6. The drive assembly according to claim 3, wherein the bridge section (253) of the second part is adapted to be mounted concentrically around the bridge section (213) of the first part.

7. The drive assembly according to claim 3, wherein the first and second part are configured such that, when the first and second part are mounted on the rotor, the bridge section of the first part (213) extends from the first attachment section (212) in a direction towards the first rim section (211), and the bridge section of the second part (253) extends from the second attachment section (252) to the second rim section (251) in a direction towards the first rim section (211).

8. The drive assembly according to claim 3, wherein the bridge section of the second part has a length along the longitudinal axis of the second part which is greater than a length of the first rim section along the longitudinal axis of the first part.

9. The drive assembly according to claim 3, wherein a distance (s1) between the attachment section (212) of the first part and the portion (215) where the bridge section (213) of the first part connects to the rim section (211) of the first part is greater than a distance (s2) between the attachment section (252) of the second part and a portion where the bridge section (253) of the second part connects to the rim section (251) of the second part.

10. The drive assembly according to claim 3, wherein for each of the first and second part the attachment section (212, 252), when projected onto a plane normal to the longitudinal axis (L1, L2) of said part, is arranged within and spaced apart from a corresponding rim section (211,251).

11. The drive assembly according to claim 10, wherein, when the first part (210) and the second part (250) are mounted on the rotor (60), the bridge section (253) of the second part is substantially arranged between the peripheral outer surface and the first part.

12. The drive assembly according to claim 3, wherein, when mounted, the rim-section (251) of the second part (250) and/or the rim section (211) of the first part (210) is radially spaced apart by a predetermined distance (h1) from the peripheral outer surface (63) and is substantially completely supported on the rotor, via the bridge section (213), by the attachment section (212).

13. The drive assembly according to claim 3, wherein the first and second part are configured such that, when mounted on the rotor, the length of the first part along the axis of rotation is greater than a sum of the length of the first rim section along the axis of rotation and the length of the second part along the axis of rotation.

14. The drive assembly according to claim 3, wherein said rim-section of said first and/or second part is provided with an air supply duct (218, 258), for supplying air to a tyre mounted on said rim section.

15. The drive assembly according to claim 14, where the air supply duct of the first and/or second part runs from the rim-section of said part to the road side (3) surface of the rotor.

16. The drive assembly according to claim 14, comprising a valve connected (219, 259) to said air supply duct for blocking air from flowing out of a space defined by the corresponding rim section and a tyre mounted thereon.

17. The drive assembly according to claim 1, wherein, when mounted on the rotor, the first part and the second part are attached to each other at or near the transverse road side surface.

18. The drive assembly according to claim 1, wherein said peripheral outer surface (63) is a circumferential outer surface and the first and second part are adapted be substantially completely spaced apart from the peripheral outer surface when mounted on the rotor.

19. A rim assembly for use in a drive assembly according to claim 1 and adapted for supporting two tyres, the rim assembly comprising:
   a circumferential first part (210) and a circumferential second part (250), each part provided (210, 250) with a rim-section (211, 251) for carrying a respective one of said two tyres,
   wherein said first part (210) and second part (250) are both adapted to be mounted on the rotor from and at the transverse road side surface (3) of the rotor and are detachable from the rotor from said transverse road side surface (3), wherein the second part (250) is detachable from the rotor independent from said first part (210),
   wherein, when mounted on the rotor, the first part and the second part are attached to each other at or near the transverse road side surface of the rotor.

20. The rim assembly according to claim 19, wherein the rim-sections (211, 251) of the first and second part (210,250) each define a longitudinal axis (L1, L2), and wherein said first and second part each comprise a substantially planar attachment section (212, 252) for mounting said part (210, 250) on the rotor at the transverse road side surface,
   wherein said first and second part each further comprise a bridge section (213, 253) which connects the rim section to the attachment section (212, 252) and extends at least partially along the longitudinal axis, and
   wherein the first and second part are configured such that, when the first and second part are mounted on the rotor, the bridge section of the first part (213) extends from the first attachment section (212) in a direction towards the first rim section (211), and the bridge section of the second part (253) extends from the second attachment section (252) to the second rim section (251) in a direction towards the first rim section (211).

* * * * *